Patented Oct. 19, 1943

2,332,014

UNITED STATES PATENT OFFICE 2,332,014

SPARK PLUG INSULATOR

Karl Schwartzwalder, Flint, Mich., assignor to General Motors Corporation, Detroit, Mich., a corporation of Delaware No Drawing. Application October 14, 1938, Serial No. 234,897

7 Claims. (Cl. 106—57)

This invention relates to insulators such as are used in spark plugs employed in internal combustion engines.

The improved insulators hereinafter disclosed are characterized by high heat conductivity thereby enabling the spark plug in which they are used to operate for longer periods than is possible with the present day porcelain insulators for the latter tend to overheat when operating under severe conditions thereby causing pre-ignition and faulty operation of the motor.

The improved insulators are also characterized by very good electrical insulating properties, especially at high temperatures, and good resistance to heat shock, the latter being an especially desirable characteristic in the case of spark plug insulators owing to the rapid changes in temperatures and the wide range of temperatures to which they are subjected.

The insulators herein disclosed show, upon chemical analysis, the presence of alumina, silica and zirconia. However, for best results these ingredients are preferably supplied in combined form, a substantial proportion of the alumina and the major portion of the silica preferably being added in the form of aluminum silicates such as kyanite, andalusite, sillimanite, mullite or clay. Of these kyanite is to be preferred because of its commercial availability at reasonable cost. Where plastic methods of manufacture are to be used clay is preferred owing to its plastic properties.

The zirconia is preferably employed in the form of zircon, which is zirconium silicate.

Good insulators have been made within the following range of compositions:

|  | Percent |
|---|---|
| Zircon | 2–10 |
| Alumina | 0–95 |
| Kyanite | 2–98 |

It will be understood, of course, that the above materials may be replaced by equivalent materials as indicated above, the percentages being expressed in terms of the above mineralogical compositions because these will be found most convenient where non-plastic methods of manufacture are employed.

An especially good composition falling within the above range is one consisting of:

|  | Percent |
|---|---|
| Alumina | 63.5 |
| Zircon | 2.5 |
| Calcined Kyanite | 34 |

This composition has especially high mechanical strength, its modulus of rupture being on the order of 29,200 pounds per square inch. It also possesses high thermal shock resistance.

To bodies of the above compositions may be added up to 10% talc to lower the maturing temperature. It has also been found that the addition of small percentages of chromium oxide, for example, up to 5%, increases the thermal conductivity as measured by spark plug efficiency.

Compositions containing less than about 25% clay necessitate manufacture by non-plastic methods. I prefer to employ the non-plastic method described and claimed in my prior U. S. Patent 2,122,960 granted July 5, 1938, although other methods known to the ceramic art may be used.

In the method as described in the patent, raw materials are first ground so that 10% or less remains on a screen having 325 mesh per linear inch. The ground materials are then mixed with resin and lubricant, this preferably being accomplished by grinding, which is continued until a large portion of the inorganic material lies between 0 and 5 microns in size. The resulting material is then granulated by mixing with water and rubbing through the desired mesh screen. It is thereafter dried to the required moisture content, preformed, pressed to final shape and cured. The resulting body is sufficiently strong so that it may be readily handled. It is fired in a suitable kiln at temperatures varying from 1600 to 1800° C. depending upon the particular composition. The binder is eliminated during the firing and the ceramic material is sintered into a dense, impervious structure.

The bodies may also be formed by the usual plastic methods employed in making porcelain insulators. In this case the raw materials must include at least 25% clay and preferably more, to give the desired plasticity to the batch. The following is a plastic composition from which good insulators were obtained.

|  | Percent |
|---|---|
| Tabular corundum | 70 |
| English ball clay | 25 |
| Zirconia or zircon | 5 |

These ingredients were mixed and pugged in a vacuum pug mill, turned to shape while in leather hard condition and fired to Orton cone 32 (1770° C.) to sinter the material into a dense body. The resulting porcelain possesses a high modulus of rupture, superior tensile strength and thermal efficiency and good electrical resistance at high temperatures as well as superior resistance to heat shock.

Where compositions containing clay are used the bodies may be formed by molding in rubber molds as described in U. S. Patent 2,091,973 granted to Albra H. Fessler and Ralston Russell, Jr., on September 7, 1937, or by the usual plastic processes of pugging, extruding and dry grinding to shape. It has been found preferable to employ in plastic mixes Florida kaolin in place of English Ball clay for the former increases the thermal conductivity of the insulator.

The alumina may be added in various commercial forms, for example, Bauer process calcined alumina; high temperature calcined alumina sold under the trade name "Tabular Corundum"; or as fused alumina.

While zirconia is preferably added as zircon it may prove desirable to add it in the form of chemically precipitated low temperature calcined zirconia. The zircon may be used in calcined or fused form.

Where alumina is added in excess of that uniting with kyanite on firing to produce mullite, the resulting body will be found to consist of mullite, corundum and zirconium silicate glass. With lesser amounts of alumina or with none at all the bodies will consist principally of mullite and glass containing zirconium silicate.

While in the claim the improved body is defined in terms of specific mineralogical forms, such as kyanite and zircon, it is to be understood that these terms include within their scope other raw materials such as herein specified which on firing produce substantially the same end products.

I claim:

1. A spark plug insulator made by sintering into a dense, non-porous body a ceramic mixture consisting of from 2 to 10% zircon, from 2 to 98% kyanite and not over 95% alumina, said insulator being fired at a sufficiently high temperature to disassociate the zircon so that the end product is free from zircon and consists of mullite and zirconium silicate glass, with any free alumina in the form of corundum.

2. A spark plug insulator characterized by high heat conductivity, good electrical insulating properties at both normal and elevated temperatures, good resistance to heat shock and high mechanical strength made by sintering into a dense, non-porous body a finely powdered ceramic mixture consisting of from 2 to 10% zircon, from 2 to 98% kyanite and from an appreciable amount to not over 95% tabular corundum, said insulator being fired at a sufficiently high temperature to convert the raw material into an end product free from zircon and consisting of mullite and zirconium silicate glass with any free alumina in the form of corundum.

3. A spark plug insulator characterized by high heat conductivity, good electrical insulating properties at both normal and elevated temperatures, good resistance to heat shock and high mechanical strength made by sintering into a dense, non-porous body a finely powdered ceramic mixture consisting of from 2 to 10% zircon, from 2 to 98% kyanite and from an appreciable amount to not over 95% tabular corundum and from an appreciable amount to not over 10% talc, said insulator being fired at sufficiently high temperature to disassociate the zircon, forming a body free from zircon and consisting of mullite and glass with any free alumina in the form of corundum.

4. A spark plug insulator characterized by high heat conductivity, good electrical insulating properties at both normal and elevated temperatures, good resistance to heat shock and high mechanical strength made by sintering into a dense, non-porous body a finely powdered ceramic mixture consisting of from 2 to 10% zircon, from 2 to 98% kyanite and not over 95% alumina and from an appreciable amount to not over 5% chromium oxide, said insulator being fired at sufficiently high temperature to disassociate the zircon, forming a body free from zircon and consisting of mullite and glass with any free alumina in the form of corundum.

5. The method of making ceramic articles characterized by high heat conductivity, good electrical insulating properties at both normal and elevated temperatures, good resistance to heat shock and high mechanical strength which consists in preparing a finely pulverized mixture consisting of from 2 to 10% zircon, from 2 to 98% kyanite and not over 95% alumina, or the equivalent in other mineralogical forms, forming an article of the desired shape therefrom, and firing the article to temperatures on the order of from 1600 to 1800° C. to sinter the material into a dense, non-porous product free from zircon and consisting of mullite and zirconium silicate glass with any free alumina in the form of corundum.

6. A spark plug insulator characterized by high heat conductivity, good electrical insulating properties at both normal and high temperatures, good resistance to heat shock and high mechanical strength, made by sintering into a dense, non-porous body an insulator formed from a finely pulverized mixture consisting of from 2 to 10% zircon, from 2 to 98% kyanite and not over 95% alumina, the end product being free from zircon and consisting of mullite, corundum and glass.

7. A spark plug insulator characterized by high heat conductivity, good electrical insulating properties at both normal and high temperatures, good resistance to heat shock and high mechanical strength, made by sintering into a dense, non-porous body an insulator formed from a finely pulverized mixture consisting of from 2 to 10% zircon, from 2 to 98% kyanite and not over 95% alumina, together with up to 10% of alkaline earth flux, the end product being free from zircon and consisting of mullite, corundum and glass.

KARL SCHWARTZWALDER.